United States Patent
Gossweiler, III et al.

(10) Patent No.: US 9,519,351 B2
(45) Date of Patent: Dec. 13, 2016

(54) PROVIDING A GESTURE-BASED INTERFACE

(71) Applicant: Google Inc., Mountain View, CA (US)

(72) Inventors: Richard Carl Gossweiler, III, Sunnyvale, CA (US); Krishna Asur Bharat, Palo Alto, CA (US); Kenneth Wayne Dauber, Palo Alto, CA (US); Paul L. Fontes, Mountain View, CA (US); Michael I. Mills, Redwood City, CA (US); Erwin S. Tam, Sunnyvale, CA (US); Vincent J. Hoon, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/078,406

(22) Filed: Nov. 12, 2013

(65) Prior Publication Data
US 2014/0253431 A1    Sep. 11, 2014

Related U.S. Application Data

(60) Provisional application No. 61/775,396, filed on Mar. 8, 2013, provisional application No. 61/775,403, filed on Mar. 8, 2013, provisional application No. 61/870,619, filed on Aug. 27, 2013.

(51) Int. Cl.
| | |
|---|---|
| *G06F 3/01* | (2006.01) |
| *G06F 3/03* | (2006.01) |
| *G06F 3/0481* | (2013.01) |
| *G06F 3/0485* | (2013.01) |

(52) U.S. Cl.
CPC ............. *G06F 3/017* (2013.01); *G06F 3/0304* (2013.01); *G06F 3/0481* (2013.01); *G06F 3/0485* (2013.01)

(58) Field of Classification Search
CPC .... G06F 3/017; G06F 3/0304; G06F 3/0481; G06F 3/0485
USPC ......................................................... 345/156
See application file for complete search history.

(56) References Cited

U.S. PATENT DOCUMENTS

| | | |
|---|---|---|
| 8,473,871 B1 | 6/2013 | Sandler et al. |
| 2003/0088832 A1 | 5/2003 | Agostinelli et al. |
| 2005/0165609 A1 | 7/2005 | Zuberec et al. |

(Continued)

OTHER PUBLICATIONS

Wikipedia, JavaScript, <https://en.wikipedia.org/wiki/JavaScript> (originally published Dec. 14, 2002) (cited revision published Jan. 7, 2016) (17 pages).

(Continued)

*Primary Examiner* — Viet Pham
(74) *Attorney, Agent, or Firm* — Finnegan, Henderson, Farabow, Garrett & Dunner, LLP

(57) ABSTRACT

Systems and methods for providing a gesture-based interface are provided. In some aspects, depth data indicative of a person interacting with one or more display devices is received. The one or more display devices display a plurality of columns. Each of the plurality of columns includes a plurality of icons. A column corresponding to a position of the person with respect to the one or more display devices is determined using the depth data. The column is from among the plurality of columns displayed at the one or more display devices. A signal for expanding a predetermined icon in the column corresponding to the position of the person with respect to the one or more display devices is provided.

22 Claims, 11 Drawing Sheets

(56) References Cited

U.S. PATENT DOCUMENTS

| | | |
|---|---|---|
| 2009/0079813 A1 | 3/2009 | Hildreth |
| 2010/0199230 A1 | 8/2010 | Latta et al. |
| 2011/0083106 A1* | 4/2011 | Hamagishi .................... 715/836 |
| 2011/0102318 A1* | 5/2011 | Pathangay et al. ........... 345/158 |
| 2011/0141009 A1* | 6/2011 | Izumi ........................... 345/156 |
| 2011/0197161 A1 | 8/2011 | Mattingly et al. |
| 2011/0242134 A1 | 10/2011 | Miller et al. |
| 2011/0296353 A1* | 12/2011 | Ahmed et al. ................ 715/848 |
| 2011/0314376 A1 | 12/2011 | Dearman et al. |
| 2012/0056989 A1* | 3/2012 | Izumi ............................. 348/46 |
| 2012/0119988 A1* | 5/2012 | Izumi ........................... 345/156 |
| 2012/0124525 A1 | 5/2012 | Kang |
| 2012/0131496 A1* | 5/2012 | Goossens et al. ............ 715/784 |
| 2012/0177285 A1 | 7/2012 | Tsurube |
| 2012/0290257 A1 | 11/2012 | Hodge et al. |
| 2012/0324368 A1 | 12/2012 | Putz et al. |
| 2013/0044916 A1 | 2/2013 | Qin et al. |
| 2013/0117698 A1* | 5/2013 | Park et al. .................... 715/765 |
| 2013/0127870 A1 | 5/2013 | Baudel et al. |
| 2013/0263029 A1 | 10/2013 | Rossi et al. |
| 2013/0305187 A1* | 11/2013 | Phillips et al. ................ 715/800 |
| 2014/0062875 A1 | 3/2014 | Rafey et al. |
| 2014/0253430 A1 | 9/2014 | Gossweiler, III et al. |
| 2014/0258943 A1 | 9/2014 | Gossweiler, III et al. |
| 2015/0279088 A1 | 10/2015 | Ma et al. |

OTHER PUBLICATIONS

Oracle, What is a Socket?, Nov. 18, 2011 by Internet Archive, The Java Tutorials, Custom Networking, All about Sockets (2 pages).
Notification Concerning Transmittal of International Preliminary Report on Patentability dated Sep. 17, 2015 for PCT/US2014/019644 (10 pages).
Written Opinion of the International Searching Authority, mailed Jun. 10, 2014 for PCT/US14/19644 (14 pages).
Notification of Transmittal of the International Search Report mailed Jun. 10, 2014 for PCT/US2014/019644 (4 pages).

* cited by examiner

PROVIDING A GESTURE-BASED INTERFACE

CROSS REFERENCE TO RELATED APPLICATIONS

This application claims priority under 35 U.S.C. §119(e) and the benefit of U.S. Provisional Application No. 61/775,396, filed Mar. 8, 2013, and entitled, "PROVIDING EVENTS RESPONSIVE TO SPATIAL GESTURES," U.S. Provisional Application No. 61/775,403, filed Mar. 8, 2013, and entitled, "PROVIDING EVENTS RESPONSIVE TO SPATIAL GESTURES," and U.S. Provisional Application No. 61/870,619, filed Aug. 27, 2013, and entitled, "PROVIDING A GESTURE-BASED INTERFACE," the entire disclosures of which are incorporated herein by reference.

BACKGROUND

The subject technology generally relates to user interactive computer systems and, in particular, relates to providing events responsive to spatial gestures.

A touch screen device may be useful on a small tablet computer, an automatic teller machine, or a store checkout machine, where a user is proximate to the touch screen. However, a touch screen device may not be useful if the user is located further away from the screen.

SUMMARY

In some aspects, the disclosed subject matter relates to a computer-implemented method for processing spatial gestures. The method includes receiving depth data from one or more depth cameras. The method includes determining, based on the received depth data, positions of multiple body parts of a person in a field of view of the one or more depth cameras. The method includes determining, based on the positions of the multiple body parts, a spatial gesture made by the person. The method includes translating the spatial gesture into an event. The method includes providing, via a two-way socket, the event to a web client for executing a function in response to the event.

In some aspects, the disclosed subject matter relates to a system for processing spatial gestures. The system includes one or more depth cameras configured to generate depth data. The system includes a display device. The system includes one or more processors. The system includes a memory including instructions. The instructions include code for determining, based on the depth data generated by the one or more depth cameras, positions of multiple joints on a body of a person in a field of view of the one or more depth cameras. The instructions include code for determining, based on the positions of the multiple joints, a spatial gesture made by the person. The instructions include code for providing, via a two-way socket, to a web client, an event representing the spatial gesture for executing a function in response to the event, the function being configured to generate a visual output for display via the display device.

In some aspects, the disclosed subject matter relates to a non-transitory computer-readable medium encoded with executable instructions for processing spatial gestures. The instructions include code for determining, based on depth data received from one or more depth cameras, positions of multiple body parts of a person in a field of view of the one or more depth cameras. The instructions include code for determining, based on the positions of the multiple body parts, a spatial gesture made by the person. The instructions include code for providing, via a two-way socket, to a web client, an event representing the spatial gesture for executing a function in response to the event.

In some aspects, the disclosed subject matter relates to a computer-implemented method for providing an output responsive to a spatial gesture. The method includes receiving, via a two-way socket, an event associated with a spatial gesture or body position information corresponding to the event. The method includes determining a function corresponding to the event, where the function includes modifying data rendered for display at a display device responsive to the spatial gesture. The method includes executing the function.

In some aspects, the disclosed subject matter relates to a non-transitory computer-readable medium encoded with executable instructions for providing an output responsive to a spatial gesture. The instructions include code for receiving, via a two-way socket, an event associated with a spatial gesture or body position information corresponding to the event. The instructions include code for determining a function corresponding to the event, where the function includes modifying data rendered for display at a display device responsive to the spatial gesture.

In some aspects, the disclosed subject matter relates to a system for providing an output responsive to a spatial gesture. The system includes one or more processors. The system includes a memory including instructions. The instructions include code for determining a function corresponding to data received via a two-way socket, where the data received via the two-way socket include an event associated with a spatial gesture or body position information associated with the event, and where the function includes providing analytics about one or more persons or one or more objects in a field of view of one or more depth cameras. The instructions include code for executing the function.

In some aspects, the disclosed subject matter relates to a computer-implemented method for providing a gesture-based interface. The method includes receiving depth data indicative of a person interacting with one or more display devices, where the one or more display devices display multiple columns, where each of the multiple columns includes multiple icons. The method includes determining, using the depth data, a column corresponding to a position of the person with respect to the one or more display devices, the column being from among the multiple columns displayed at the one or more display devices. The method includes providing a signal for expanding a predetermined icon in the column corresponding to the position of the person with respect to the one or more display devices.

In some aspects, the disclosed subject matter relates to a non-transitory computer-readable medium encoded with executable instructions for providing a gesture-based interface. The instructions include code for receiving depth data indicative of a first person and a second person interacting with one or more display devices, where the one or more display devices display multiple sets of icons. The instructions include code for determining, using the depth data, a first set of icons corresponding to a position of the first person with respect to the one or more display devices, the first set of icons being from among the multiple sets of icons displayed at the one or more display devices. The instructions include code for determining, using the depth data, a second set of icons corresponding to a position of the second person with respect to the one or more display devices, the second set of icons being from among the multiple sets of icons displayed at the one or more display devices. The instructions include code for providing a command for expanding a first predetermined icon in the first set of icons and for expanding a second predetermined icon in the second set of icons, while continuing to provide for display of the multiple sets of icons.

In some aspects, the disclosed subject matter relates to a system for providing a gesture-based interface. The system includes one or more processors. The system includes a memory including instructions. The instructions include code for receiving depth data indicative of a person interacting with one or more display devices, where the one or more display devices display multiple columns, where each of the multiple columns includes multiple icons. The instructions include code for determining, using the depth data, a column corresponding to a position of the person with respect to the one or more display devices, the column being from among the multiple columns. The instructions include code for providing a signal for expanding a predetermined icon in the column corresponding to the position of the person with respect to the one or more display devices. The instructions include code for providing a signal for decreasing a size of at least one other icon in the column corresponding to the position of the person with respect to the one or more display devices.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
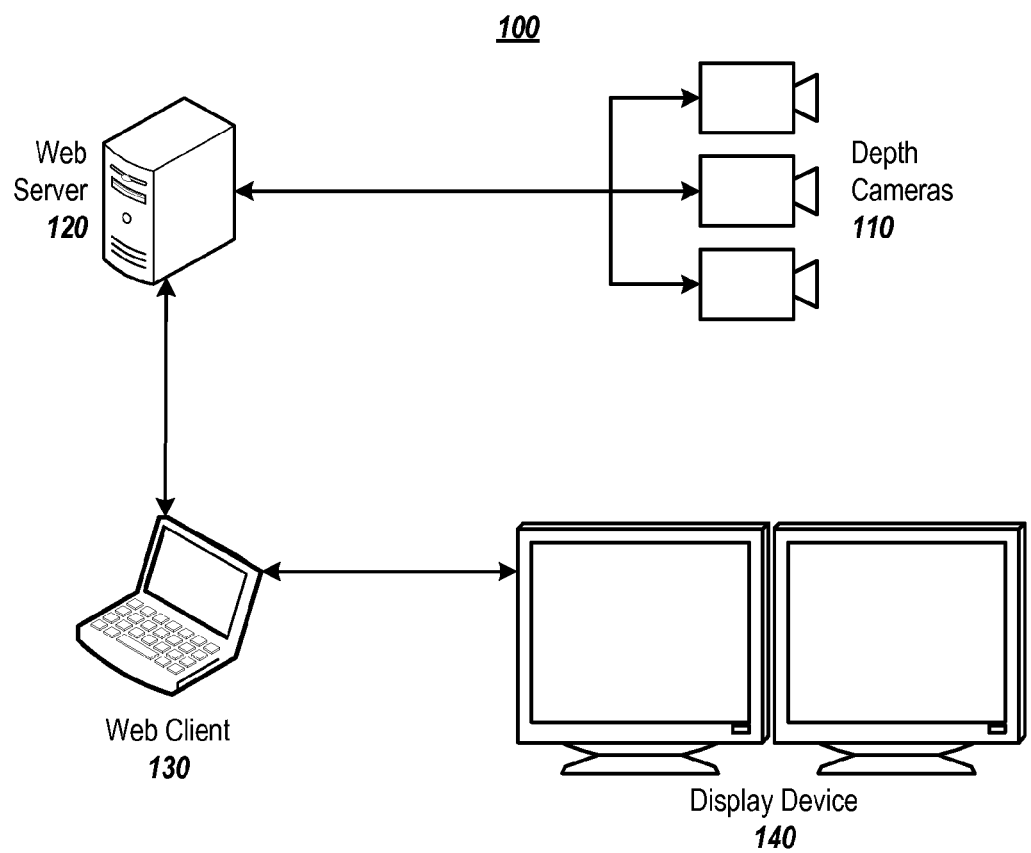
FIG. 1 illustrates an example of a system for providing events responsive to spatial gestures.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, a touch screen device may be useful on a small tablet computer, an automatic teller machine, or a store checkout machine, where a user is proximate to the touch screen. However, a traditional touch screen device may not be as convenient on a larger display device (e.g., one or more television-size screens) or for receiving inputs beyond touch gestures, pointer device inputs, or button presses (e.g., non-touch gesture-based inputs). As the foregoing illustrates, a non-touch gesture-based interface for a larger display device may be desirable. Non-touch gestures include, for example, waving a hand, moving an arm across one's body, stomping a foot, etc.

The subject technology provides a gesture-based interface for a display device. According to some implementations, one or more depth cameras are coupled with a web server. In some aspects, the web server communicates with a web client over a network or another connection. In some aspects, the web server and the web client reside on a single machine. The web client is coupled with a display device. In some aspects, the depth camera(s) are embedded within the display device or placed adjacent to the display device. The web server receives depth data from the depth camera(s). If a person is in a field of view of the depth camera(s), the server determines, based on the received depth data, positions of multiple body parts (e.g., hands, feet, head, arms, legs, torso, etc.) of the person. The web client may request, from the web server the positions of multiple body parts of one or more persons, in the field of view of the depth camera(s). The web server determines whether the positions of the multiple body parts correspond to a stored spatial gesture. If so, the web server translates the spatial gesture into an event. The event is provided to the web client for executing a function in response to the event.

The web client listens for event(s) associated with spatial gesture(s). The event(s) may be provided to the web client by the web server, as set forth above, or the web client may request, from the web server the positions of the multiple body parts of one or more persons, in the field of view of the depth camera(s) and determine event(s) that are associated with spatial gesture(s) based on the positions of the multiple body parts. Upon determining that an event has occurred, the web client executes a function corresponding to the event. The function may include modifying data rendered for display at the display device. For example, an image displayed by the display device may be changed. Alternatively, the function may include providing analytics about people or objects in the field of view of the depth camera(s).

As used herein, the term "event" encompasses its plain and ordinary meaning including, but not limited to, a computerized indication of an occurrence in a computer program, an action by a user, a stimulus detected by a computer, etc. The computerized indication may be transmitted from one module to another module within a single computing device or from one computing device to another computing device, for example, from a web server to a web client or vice versa. Some example events include a "load" event that is provided (e.g., fired) when a webpage is loaded or a "mouse-click" event that is provided when a mouse is clicked. For instance, a webpage may include a first video advertisement and a second video of a dancing cat. In the webpage, the "load" event may be mapped to the function of playing the first video advertisement, and the "mouse-click" event, where the mouse is clicked over a browser-embedded video player, may be mapped to the function of playing the second video of the dancing cat. As a result, when the webpage is loaded, the first video advertisement is played, and when the mouse is clicked over the browser-embedded video player, the second video of the dancing cat is played. An event may be a JavaScript event or an event in any other programming language or scripting language.

FIG. 1 illustrates an example of a system 100 for providing events responsive to spatial gestures.

As shown, the system 100 includes one or more depth cameras 110, a web server 120, a web client 130, and a display device 140. While FIG. 1 illustrates the display device 140 as including two screens, the display device 140 can include any number of screens arranged in any configuration. While FIG. 1 illustrates three depth cameras 110, the subject technology can be implemented with any number of depth cameras 110 arranged in any configuration.

The depth camera(s) 110 are configured to obtain depth information from a scene visible to the depth camera(s) 110 and to provide the received depth information to the web server 120. In some examples, the depth camera(s) can also provide black-and-white or color images or scene information (e.g., image(s) of the scene) to the server 120. In some aspects, a single depth camera or multiple depth cameras determines depth information, for example, using radar or other depth measuring technologies. In some implementations, image data from multiple cameras is interpolated to provide depth information. The depth cameras can include at least two close view depth cameras for receiving depth data within a first threshold distance (e.g., one meter) of a display device and at least one wide view depth camera for receiving depth data between the first threshold distance and a second threshold distance (e.g., between one meter and ten meters) of the display device. The close view depth cameras may be different types (e.g., makes and/or models) of camera from the wide view depth camera(s). Alternatively, the close view depth cameras and the wide view depth camera(s) may be the same type of camera with the respective fields of view positioned to capture different ranges. As a result, the depth cameras may not need to be moved and may receive depth data from both user(s) standing very close to the display device and user(s) located further from the display device or walking by the display device.

The web server 120 may be configured to receive depth data from the depth camera(s) 110. The web server 120 may be configured to determine, based on the received depth data, whether a person is in a field of view of the depth camera(s) 110, and, if so, positions of multiple body parts (e.g., head, arms, hands, legs, feet, etc.) of the person in the field of view of the depth camera(s) 110. The web server 120 may be configured to determine, based on the positions of the multiple body parts a spatial gesture made by the person. For example, the person may wave his/her left hand or move his/her right hand from the left to the right as if drawing a line or moving an object. The web server 120 may be configured to translate the spatial gesture into an event. For example, the web server may store a data structure, for example, a table, a hash table, an array, a list, etc., mapping spatial gesture(s) to event(s). A lookup in the data structure may be used to translate the spatial gesture into the event. The web server 120 may be configured to provide the event to the web client 130 for executing a function in response to the event. As used herein, a spatial gesture may include, among other things, a movement of a body part of a person in three-dimensional space. In alternative implementations, the web server may not be configured to carry out one or more of the above-listed functions or the web server may be configured to implement different functions from those listed above.

The web client 130 is configured to receive the event associated with the spatial gesture and provided by the web server 120. The web client 130 is configured to determine a function corresponding to the event and to execute the function. Executing the function may include modifying data rendered for display at the display device 140 according to the function. The web server 120 and the web client 130 can communicate using any communication protocol. In some examples, the web server 120 and the web client 130 communicate via a two-way socket. In some aspects, the two-way socket communication is accomplished via a transmission control protocol (TCP) connection. The TCP connection is identified by two endpoints—the web server 120 and the web client 130. Using the two-way sockets, the web client 130 is configured to listen for and accept connections from the web server 120. For example, when the web server 120 observes a spatial gesture that may be of interest to the web client 130, the web server 120 may use the two-way socket to alert the web client 130 of the event and/or to transmit the event to the web client 130. In some implementations, a single machine includes both the web server 120 and the web client 130, and either two-way socket communication is used within the single machine or a form of communication different from two-way socket communication is used within the single machine. In some implementations, the web server 120 and the web client 130 reside on separate machines and a form of communication different from two-way socket communication is used to communicate between the web server 120 and the web client 130.

The display device 140 is configured to display data provided by the web client 130 responsive to events generated at the web server 120 and received at the web client 130 or to events generated at the web client 130. As shown, the display device 130 runs through the web client 130. However, in some examples, the display device 140 may be accessible to the web server 120 by device(s) other than the web client 130.

As shown, the depth camera(s) 110 are separated from the display device 140. However, in some examples, the depth camera(s) 110 can be embedded within the display device 140 or placed adjacent to (e.g., on top of) the display device 140. Furthermore, as illustrated in FIG. 1, the web server 120 and the web client 130 are separate machines. However, in some aspects, a single machine may implement the functions of both the web server 120 and the web client 130.

Figure 2:
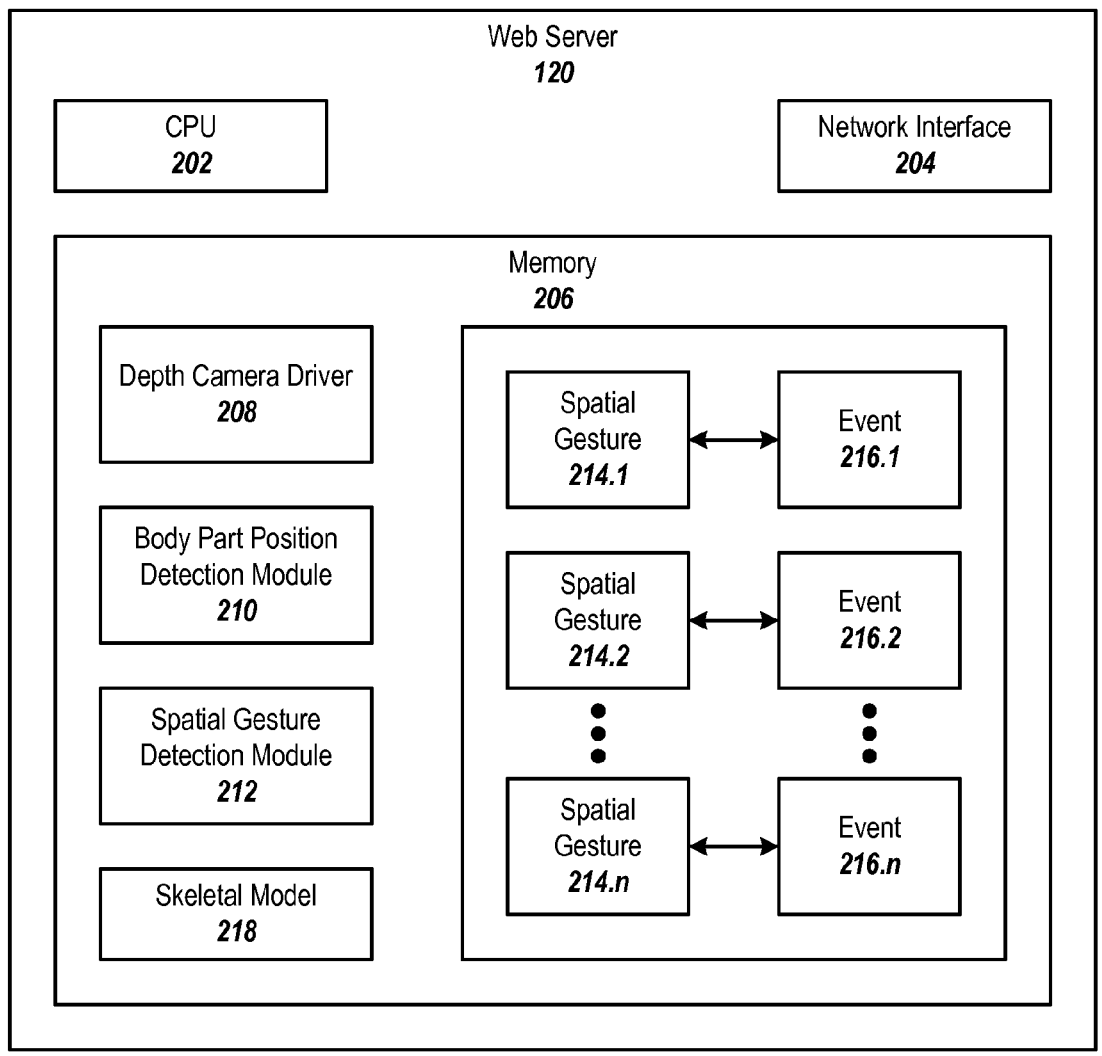
FIG. 2 illustrates an example of the web server of FIG. 1.

FIG. 2 illustrates an example of the web server 120 of FIG. 1.

As shown, the web server 120 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the web server 120 to transmit and receive data in a network, e.g., the Internet, a cellular network, a local area network (LAN), a wide area network (WAN), a WiFi network, etc. The network interface 204 may include one or more network interface controllers (NICs). The memory 206 stores data and/or instructions. The memory 206 may be one or more of a cache unit, a storage unit, an internal memory unit, or an external memory unit. As illustrated, the memory 206 includes a depth camera driver 208, a body part position detection module 210, a spatial gesture detection module 212, representations of spatial gestures 214.1-*n*, associated events 216.1-*n*, and a skeletal model 218.

The depth camera driver 208 is associated with one or more depth cameras (e.g., depth camera(s) 110) and is configured to receive depth data from the one or more depth cameras. The depth camera driver 208 may receive image information (e.g., color, grayscale, etc.) and depth information for each pixel from the coupled depth camera(s). In some implementations, each pixel is associated with a color value and a distance value. The distance value may be measured in any units of distance, for example, millimeters, centimeters, meters, etc. The color value may be a black-or-white value, a grayscale value, or a full color value (e.g., an RGB value or a YCbCr value). While a single depth camera driver 208 is illustrated in FIG. 2, the subject technology may be implemented with one or multiple depth camera drivers.

The body part position detection module 210 is configured to determine, based on the depth data received by the depth camera(s), positions of body parts of a person in a field of view of the depth camera(s). The body parts can include body junctions. Body junctions include, for example, a neck, a shoulder, an elbow, a wrist, a hip, a knee, or an ankle. The positions of the body parts can be determined, by the body part position detection module, based on skeletal model 218, which is described in greater detail below.

The spatial gesture detection module 212 is configured to determine, based on the positions of the body parts, a spatial gesture made by the person. The spatial gesture can be any stored spatial gesture 214.*k*, for example, a wave of an arm, a movement of an arm across a body, a shaking of a head, a stomp of a foot, a rubbing of a stomach, etc.

The spatial gesture detected by the spatial gesture detection module 212 can be translated into an event. As shown, the memory 206 stores one or more spatial gestures 214.1-*n*. Each spatial gesture 214.*k* is associated with an event 216.*k*, which is fired (e.g., transmitted to the web client 130) when the spatial gesture 214.*k* is detected. The spatial gestures 214.1-*n* stored at the web server 120 may include a set of spatial gestures most commonly requested by web client(s), for example, waving of an arm.

The skeletal model 218 includes a model of a human body including a position of body junctions or joints and a set of possible movements that may be made by bending at the body junctions or joints. In some implementations, the skeletal model 218 may include a model of a type of body other than a human body, for example, a body of an animal such as a dog or a cat. By accessing the skeletal model 218, the web server 120 is able to recognize human bodies and movements of human bodies in depth data received from the depth camera(s). The skeletal model 218 may be used to identify position(s) of body junction(s) in an image (e.g., a depth image) or movement(s) by bending body junction(s) in a set of moving images (e.g., depth images) or a video (e.g., a depth video). For example, a skeletal model of a human body may store that a knee joint appears near a midpoint of a human leg and is capable of being bent backward up to 180 degrees. The bending of the knee joint may cause the human to sit, walk, or run, especially when both knee joints, on both legs, are bent in conjunction.

Figure 3:
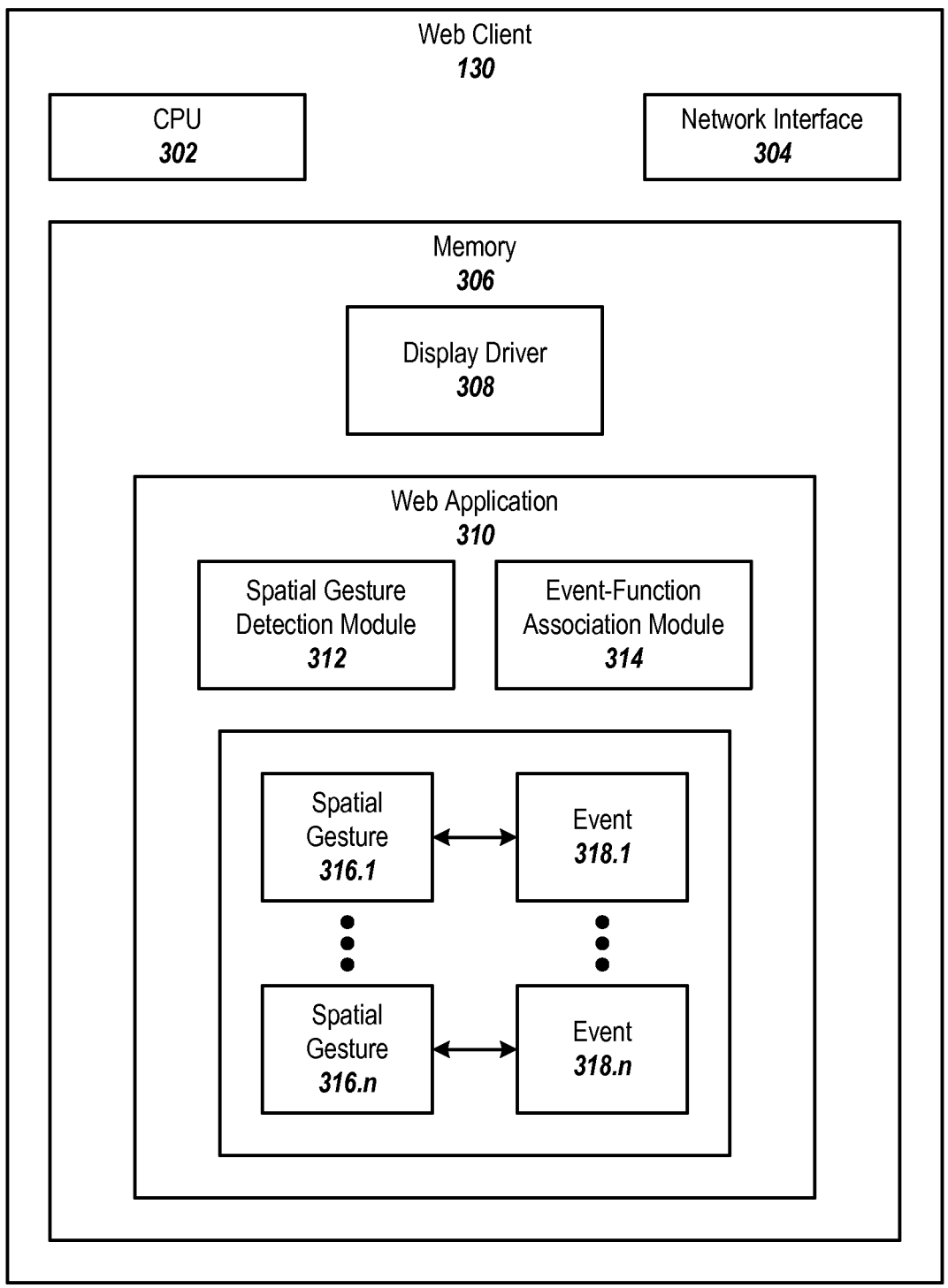
FIG. 3 illustrates an example of the web client of FIG. 1.

FIG. 3 illustrates an example of the web client 130 of FIG. 1.

As shown, the web client 130 includes a central processing unit (CPU) 302, a network interface 304, and a memory 306. The CPU 302 includes one or more processors. The CPU 302 is configured to execute computer instructions that are stored in a computer-readable medium, for example, the memory 306. The network interface 304 is configured to allow the web client 130 to transmit and receive data in a network, e.g., the Internet, a cellular network, a local area network (LAN), a wide area network (WAN), a WiFi network, etc. The network interface 304 may include one or more network interface controllers (NICs). The memory 306 stores data and/or instructions. The memory 306 may be one or more of a cache unit, a storage unit, an internal memory unit, or an external memory unit. As illustrated, the memory 306 includes a display driver 308 and a web application 310.

The display driver 308 is associated with a display device (e.g., display device 140). As shown, the web client 130 includes a single display driver. However, in a system with multiple display devices, there may be multiple display drivers. The display driver 308 is configured to render data for display at the display device or modify data rendered for display at the display device, for example, in response to an event.

The web application 310 is configured to, upon receiving an event (e.g., an event fired from the web server 120 or an event detected locally at the web client 130), determine a function corresponding to the event. The event is associated with a spatial gesture. The web application 310 is also configured to execute the function. Executing the function may include modifying, via operation of the display driver 308, data rendered for display at the display device according to the function. Alternatively, executing the function may include providing analytics about person(s) or object(s) in the field of view of the depth camera(s). As shown, the web application 310 includes a spatial gesture detection module 312, an event-function association module 314, representations of spatial gestures 316.1-*n*, and associated events 318.1-*n*.

The spatial gesture detection module 312 operates similarly to the spatial gesture detection module 212 of the web client 120 of FIG. 2. The spatial gesture detection module 213 is configured to determine, based on the positions of the body parts received at the web client 130 from the web server 120, a spatial gesture made by the person. The spatial gesture can be any stored spatial gesture 316.*k* at the web client 130, for example, a wave of one's arm, a movement of one's arm across one's body, a shaking of one's head, a stomp of one's foot, a rubbing of one's stomach, etc. The spatial gesture can be and advanced gesture combination, for example, patting one's head and rubbing one's stomach.

The spatial gesture detected by the spatial gesture detection module 312 can be translated into an event, for example, by using a lookup in a data structure stored at the web client 130. The data structure may be, for example, a table, a hash table, an array, a list, etc. mapping spatial gesture(s) to event(s). As shown, the web application 310 stores one or more spatial gestures 316.1-*n*. Each spatial gesture 316.*k* is associated with an event 318.*k*, which is fired when the spatial gesture 316.*k* is detected. The spatial gestures 316.1-*n* stored at the web client 130 may include a set of spatial gestures defined at the web client 130 based on the needs of the web client 130 for the web application. For example, if the web application 310 is a kick boxing instruction application, a kicking spatial gesture 316.*k* may be defined within the web application 310, whereas the kicking gesture may not be stored at the web server 120 as such a spatial gesture is rarely needed outside the kick boxing instruction application.

The event-function association module 314 is configured to determine a function corresponding to an event. The event can be an event corresponding to a spatial gesture (e.g., one of the spatial gestures 316.1-*n* or 214.1-*n*). The function can include modifying data rendered for display at the display device. For example, if the spatial gesture associated with the event is a movement of a hand across a person's body from left to right, the event can be moving an object displayed on the display device from left to right according to the hand movement.

Figure 4:
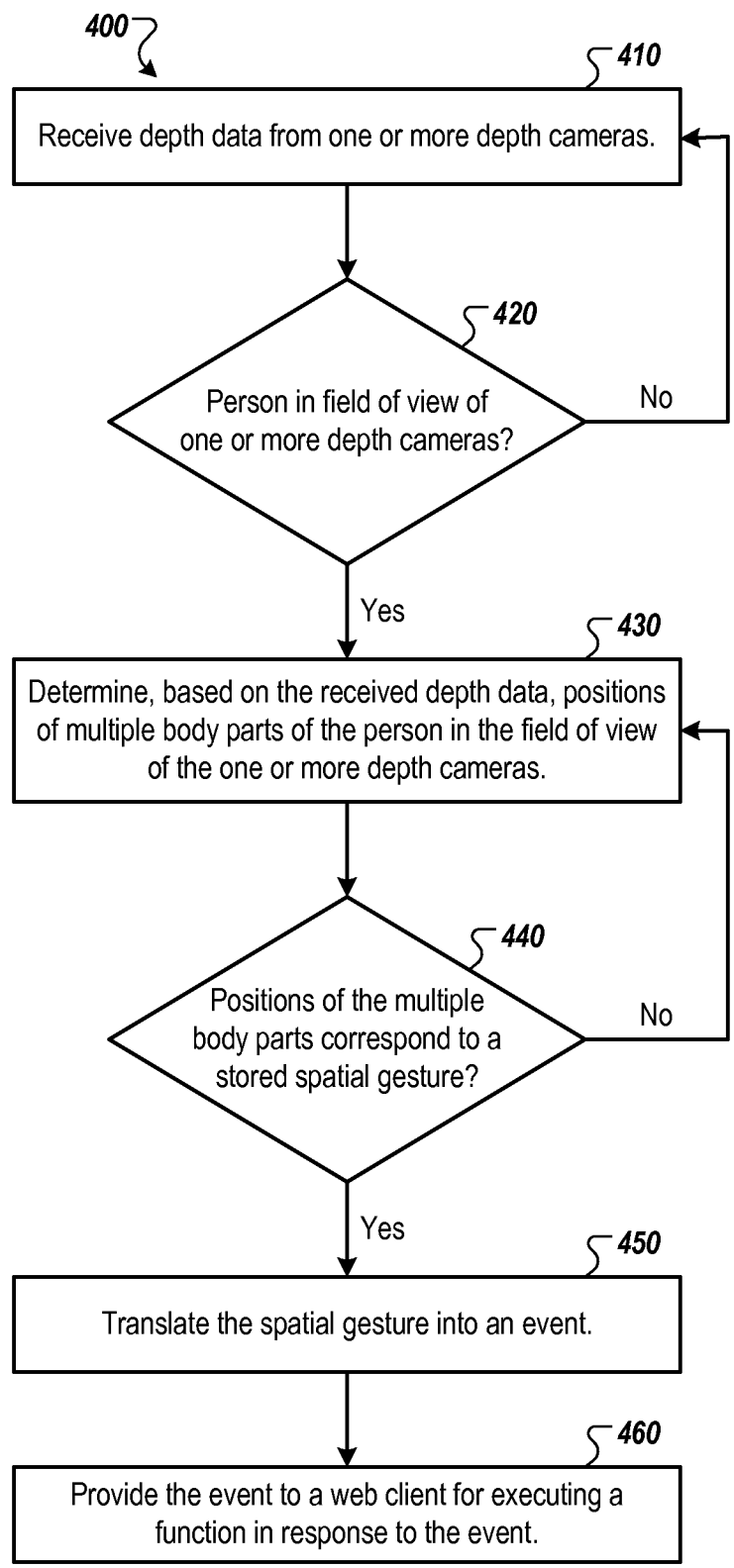
FIG. 4 illustrates an example process by which an event responsive to a spatial gesture may be provided.

FIG. 4 illustrates an example process 400 by which an event responsive to a spatial gesture may be provided.

The process 400 begins at step 410, where a web server (e.g., web server 120) receives depth data from one or more depth cameras (e.g., depth camera(s) 110). The web server may also receive image data from the depth camera(s). In some examples, the web server receives the depth data using a depth camera driver (e.g., depth camera driver 208).

In step 420, the web server determines whether a person is in the field of view of the depth camera(s) based on the received depth or image data. In some aspects, the web server determines whether a person is in the field of view based on one or more of motion detection, facial recognition, body junction or body part recognition (e.g., based on the skeletal model 218), etc. The person can be the only person in the field of view of the depth camera(s) or one of multiple persons in the field of view of the depth camera(s). If a person is in the field of view of the depth camera(s), the process 400 continues to step 430. If not, the process 400 returns to step 410.

In step 430, the web server determines, based on the received depth data, positions of multiple body parts of the person in the field of view of the one or more depth cameras. In some examples, the web server uses a body part position detection module (e.g., body part position detection module 210) to determine the positions of the multiple body parts.

In step 440, the web server determines whether the positions of the multiple body parts correspond to a stored spatial gesture, for example, using a spatial gesture detection module (e.g., spatial gestured detection module 212). In some examples, a gesture may reflect movement and, therefore, may require multiple captures of depth information at different times. Thus, step 430 may need to be repeated multiple times for the web server to determine, in step 440, that the positions of the multiple body parts correspond to a stored spatial gesture. If the positions of the multiple body parts correspond to a stored spatial gesture, the process 400 continues to step 450. If not, the process 400 returns to step 430.

In step 450, the web server translates the spatial gesture into an event. In some examples, the web server stores a data structure (e.g., a table) of spatial gestures (e.g., spatial gestures 214.1-*n*) and corresponding events (e.g., events 216.1-*n*), where each stored spatial gesture has a corresponding event (e.g., spatial gesture 214.*k* corresponds to event 216.*k*). The web server uses the stored data structure to translate the spatial gesture into the event. If there are multiple persons in the field of view of the depth camera(s), the event can be coupled with an identifier of the person who made the spatial gesture. In some aspects, every face viewed by the depth cameras is coupled with a facial identifier to uniquely identify a person. In some examples, if facial recognition is not available (e.g., due to poor resolution or lack of facial recognition software), an object in the field of view having the shape and joints of a person is identified as a unique person. The person is identified by having continuous movements with respect to time over multiple frames (e.g., the person will move smoothly from one position to another rather than shifting from one edge of a field of view to another edge of the field of view without passing through the middle). Thus, the person can be uniquely identified based on his/her position, without recognizing his/her facial features. In some cases, a person's facial features may not be recognized if the camera does not have a clear view of the person's face, for example, if the person's face is obstructed relative to the camera or the person is turned away from the camera.

As a result, the web server is able to associate received spatial gestures with a person and is able to store information about a person, for example, in a case where facial recognition is implemented, if the person leaves the field of view of the depth cameras and later returns. The web server does not associate the facial identifier with any data stored outside the web server and does not associate the facial identifier with a name or other information that could be used to associate the facial identifier with a real-life person. Each of the multiple persons can be associated with his/her own identifier, and positions of body parts of each of the multiple persons can be determined.

In step 460, the web server provides (e.g., using the network interface 204) the event to a web client (e.g., web client 130) for executing a function in response to the event. The event may be provided to the client via a two-way socket. The web server may provide the event to the web client automatically, without receiving a prompt from the web client. Alternatively, the web server may receive, from the web client, a request for spatial gesture information. The event is provided to the web client in response to the request for spatial gesture information. The request, from the web client, for spatial gesture information can be a request to notify the web client in a case where the person makes a specific gesture (e.g., if the person waves a hand).

In some aspects, the two-way socket communication is accomplished via a transmission control protocol (TCP) connection. The TCP connection is identified by two endpoints—the web server and the web client. Using the two-way sockets, the web client is configured to listen for and accept connections from the web server. For example, when the web server observes a spatial gesture that may be of interest to the web client, the web server may use the two-way socket to transmit the event to the web client and to alert the web client to the event. As a result of the two-way socket implementation, the web client is able to listen for information (e.g., events) from the web server, and to respond to the events upon receiving indicia of the events. While waiting for an event (e.g., an event associated with a spatial gesture), the web client may be in a sleep mode or may be processing other code or providing other information to a user, in a manner similar to how a smart phone may be in a sleep mode or may be running an application or providing audio or visual information to a user while "listening" for an incoming telephone call. In some examples, a different protocol, for example user datagram protocol (UDP), may be used in place of TCP.

The event is provided to the web client for executing a function in response to the event. The function may be configured to generate a visual output for display via a display device (e.g., display device 140). In some examples, the visual output is provided at a position on the display device, where the position on the display device is determined based on a position of the person making the spatial gesture. The one or more depth cameras may receive data representing the position of the person relative to the display device. Alternatively or in addition to generating the visual output, the function may be configured to generate an audio output or another type of output.

According to some implementations, the web server also determines, based on the received depth or image data, a position of an object (e.g., a ball, a pen, etc.) and provides, to the web client, information based on the position of the object. The object can be identified based on a quick response (QR) code on the object, stored information corresponding to the object, or an input identifying the object. According to some aspects, the web server receives, from the web client, in response to the event, a representation of an output of the function. The web server provides, for presentation to a user (e.g., the person making the spatial gesture) the output of the function in the received representation. After step 460, the process 400 ends.

Figure 5:
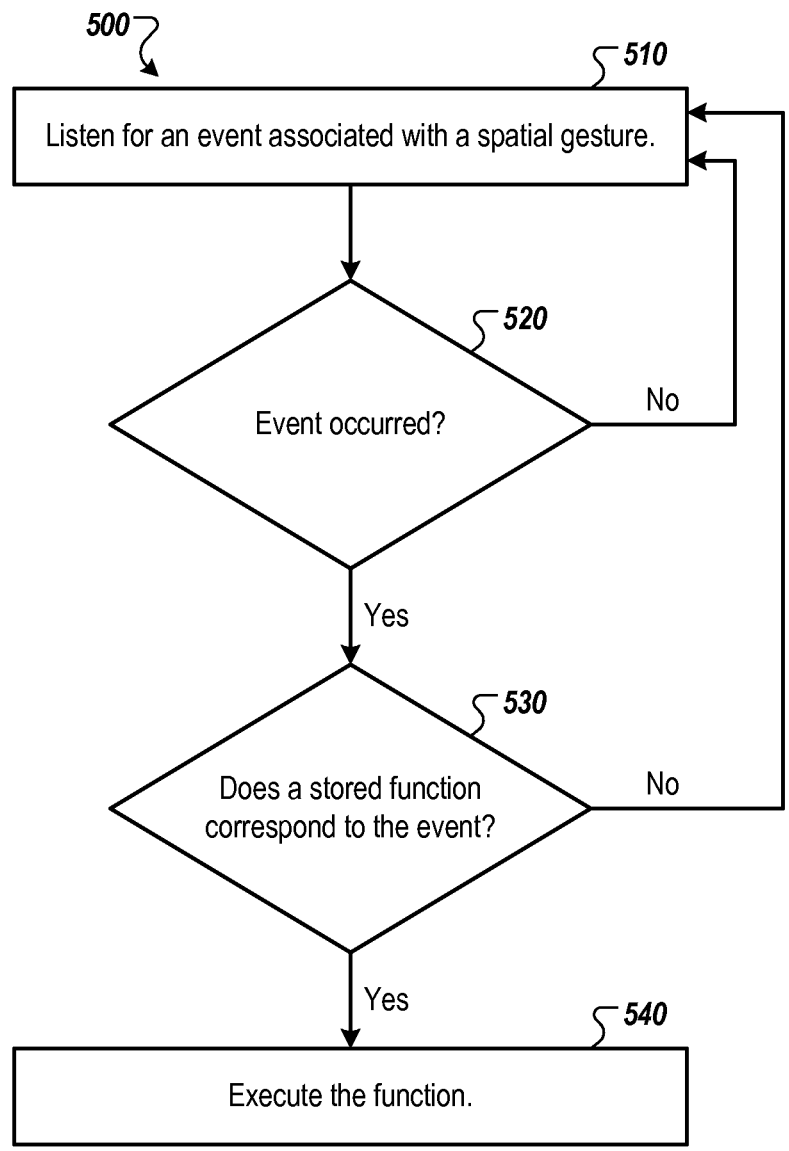
FIG. 5 illustrates an example process by which a function may be executed in response to an event.

FIG. 5 illustrates an example process 500 by which a function may be executed in response to an event.

The process 500 begins at step 510, where a web client (e.g., web client 130) listens for an event associated with a spatial gesture. The event may be fired from a web server (e.g., web server 120 with which the web client 130 can communicate, for example, via network interface 304) based on data received at the web server from one or more depth cameras (e.g., depth camera(s) 110) and received at the web client from the web server.

Alternatively, the event may be fired from the web client based on body junction or body part position data received at the web client from the web server. The web client may receive, from the web server, a representation of positions of multiple body parts. The representations of the positions of the multiple body parts, may include, for example, an identifier of a person to whom the body part belongs, an identifier of the body part, an (x, y, z) coordinate of the body part relative to a predetermined origin (e.g., a position of one of the depth cameras), and a current time. The web client may determine the event based on the positions of the multiple body parts (for example, using the spatial gesture detection module 312 to detect the spatial gesture that corresponds to the event and/or using a data structure, stored on the web client 130, that associates spatial gestures 316.1-n with corresponding events 318.1-n, where each spatial gesture 316.k corresponds to an event 318.k). The spatial gesture associated with the event is made by at least a portion of the multiple body parts.

In step 520, the web client determines whether an event has occurred based on the listening for the event of step 510. If the event has occurred, the process 500 continues to step 530. If the event has not occurred, the process 500 returns to step 510.

In step 530, the web client determines whether a stored function corresponds to the event (e.g., using the event-function association module 314). The web client may store a table or another data structure of events and corresponding stored functions. If the stored function corresponds to the event, the process 500 continues to step 540. If the stored function does not correspond to the event, the process 500 returns to step 510.

In step 540, the web client executes the function. In some aspects, executing the function includes modifying data rendered for display at a display device (e.g., display device 140) according to the function. The data rendered for display at the display device can be modified using a display driver (e.g., display driver 308). In some implementations, executing the function includes providing analytics about one or more person(s) or one or more object(s) in the field of view of the depth camera(s). For example, the web client could provide analytics regarding whether people make a movement (e.g., wave a hand, blink eyes, etc.) in response to seeing an image on the display device. Alternatively, the web client could provide analytics regarding the correlation of movements of various body parts (e.g., whether a person moving his/her right arm is likely to simultaneously move his/her left arm) or regarding the effect of human bodily movement(s) on objects (e.g., how a trajectory of a thrown ball is impacted by the human bodily movement(s) involved in throwing the ball).

Any known spatial gesture or any known function may be associated with the event. For example, a spatial gesture including hovering a hand within a first threshold distance (e.g., 1.2 meters) of the display device may correspond to a "hand-hover" event. A function corresponding to the "hand-hover" event may include visually emphasizing (e.g., highlighting or drawing a border around) an icon proximate to the hand on the display device. In another example, a spatial gesture including placing a hand within a second threshold distance (e.g., 0.6 meters) of the display device may correspond to a "hand-close" event. A function corresponding to the "hand-close" event may include selecting the icon proximate to the hand on the display device. In yet another example, a spatial gesture including pointing a hand of a first person toward a second person may correspond to a "point-to-person" event. A function corresponding to the "point-to-person" event may include passing control of a displayed object on the display device from the first person to the second person. For example, the displayed object could be a ball displayed on a ball displayed on the display device that is held by an avatar corresponding to the first person. When the first person points his/her hand to the second person, the ball is transferred from the avatar corresponding to the first person to an avatar corresponding to the second person. Alternatively, the displayed object could be a single object (e.g., a keypad) that is used for operating (e.g., typing characters) on the screen and is controlled by one person at a time. A first person who is using the keypad can pass control of the keypad to a second person by pointing his/her hand toward the second person. In a further example, a spatial gesture including waving a hand in a direction (e.g., to the right) may correspond to a "wave-hand-in-direction" event. A function corresponding to the "wave-hand-in-direction" event may include shifting one or more icons displayed on the display device in the direction.

According to some aspects, a spatial gesture including a person entering a field of view of the depth camera(s) may correspond to a "person-enter" event. A function corresponding to the "person-enter" event may include displaying an advertisement or other displayed data, that was not previously displayed, on the display device. In other examples, a spatial gesture including a person approaching a region of the display device may correspond to a "person-approaches-region" event. A function corresponding to the "person-approaches-region" event may include modifying displayed information or increasing a resolution of visual information displayed in the region of the display device responsive to the person approaching the display device. For example, if a man and a woman approach the display device together, the display device may display an advertisement for men's and women's shoes. As the woman moves closer to a region of the display device, the web server may determine, based on facial or body features, that the woman is female, and display more detailed information about women's shoes in the region of the display device proximate to the woman, while continuing to present the advertisement in other parts of the display device. Alternatively, if the advertisement includes multiple shoes, as the woman approaches the display device, the shoes presented at the position where the woman approached may be presented in greater detail or with greater resolution.

The function can include providing audio output or receiving audio input. In some examples, the audio output is provided from a specific speaker selected from among multiple speakers. The specific speaker is selected based on the specific speaker being at a position proximate to a determined position of a person. In some implementations, the audio input is received from a specific microphone selected from among multiple microphones. The specific microphone is selected based on the specific microphone being at a position proximate to a determined position of a person. After step 540, the process 500 ends.

Figure 6:
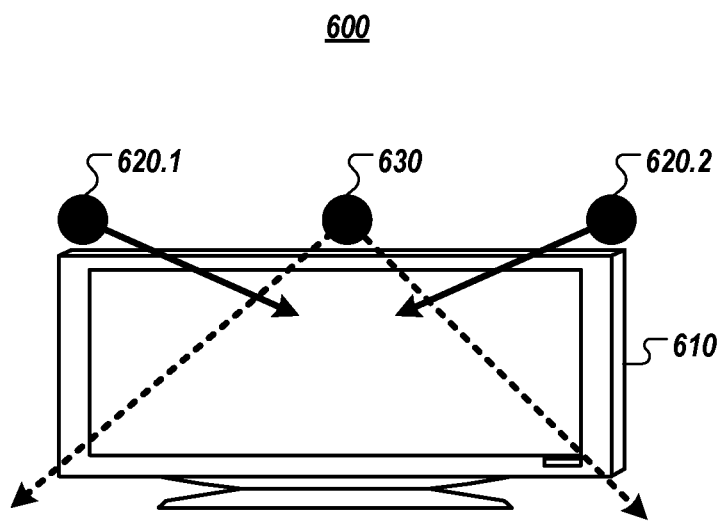
FIG. 6 illustrates an example of hardware for providing events responsive to spatial gestures.

FIG. 6 illustrates an example of hardware 600 for providing events responsive to spatial gestures.

As shown, the hardware 600 includes a display device 610 and depth cameras 620.1, 620.2, and 630. The display device 610 corresponds to the display device 140 of FIG. 1. The depth cameras 620.1, 620.2, and 630 correspond to the depth camera(s) 110 of FIG. 1. As shown, the depth cameras 620.1, 620.2, and 630 include at least two close view depth cameras 620.1 and 620.2 and at least one wide view depth camera 630.

The display device 610 is configured to display data responsive to input received via the depth cameras 620.1, 620.2, and 630, for example, as described above. The display device 610 can include a single screen, multiple screens, projection screen(s), or other display device(s). In some examples, the display device 610 is a flat screen monitor having a length of 4 meters and a height of 1.6 meters. In some examples, the display device 610 includes multiple flat screen monitors placed adjacent to one another. Each of the multiple flat screen monitors can have its own close view depth cameras or wide view depth camera(s) or two or more of the multiple flat screen monitors can share close view depth cameras or wide view depth camera(s).

As shown, the close view depth cameras 620.1 and 620.2 are pointed (as indicated by arrows) inward toward the center of the display device 610. The close view depth cameras 620.1 and 620.2 are positioned proximate to the top left (e.g., depth camera 620.1) and top right (e.g., depth camera 620.2) corners of the display device 610 and are directed at an angle below a predetermined maximum threshold angle (e.g., 20 degrees, 30 degrees, or 45 degrees) with the display device so that the close view depth cameras 620.1 and 620.2 receive data associated with positions close to (e.g., immediately in front of, within 20 centimeters of, within 30 centimeters of, within one meter of, etc.) the display device. The close view depth cameras 620.1 and 620.2 are for receiving depth data within a first threshold distance (e.g., one meter) of the display device. The close view depth cameras 620.1 and 620.2 are for detecting presence or movement of person(s) within the first threshold radius of the display device 610.

Each of the two close view depth cameras 620.1 and 620.2 can be associated with its own coordinate system. To allow visual and depth information received from the depth cameras 620.1 and 620.2, the coordinate system for each close view depth camera 620.1 and 620.2 can be converted into a common coordinate system, for example, by using fusion calibration, as described in greater detail below.

The wide view depth camera 630 can be positioned anywhere on or proximate to the display device 610, for example proximate to the center of the top of the display device 610, as shown. While only a single wide view depth camera 630 is illustrated, the subject technology may be implemented with multiple wide view depth cameras. The wide view depth camera is for receiving depth data within a second threshold distance (e.g., 10 meters) of the display device. The second threshold distance is greater than the first threshold distance. The wide view depth camera 630 is for detecting presence or movement of person(s) within the second threshold radius of the display device 610.

As a result of the hardware 600 described above, different depth cameras may be used for receiving close view data and wide view data. Due to the use of different depth cameras for observing close view data and wide view data, the hardware 600 may be built without any moving parts, increasing the lifetime of the hardware. (Alternatively, moving depth camera(s) could be used that would first detect movement in the wide view area and, later, move in to focus on the close view area when a user enters the close view area. In other words, the depth camera(s) can move to follow the movement of the user.) In addition, by having different close view depth cameras 620.1 and 620.2 and wide view depth cameras 630, the hardware 600 can be configured to simultaneously provide information (e.g., via the display device 610) to users who are close to the display device 610 in the field of view of the close view depth cameras 620.1 and 620.2 and users who are further from the display device and in the field of view of the wide view depth camera 630.

Figure 7:
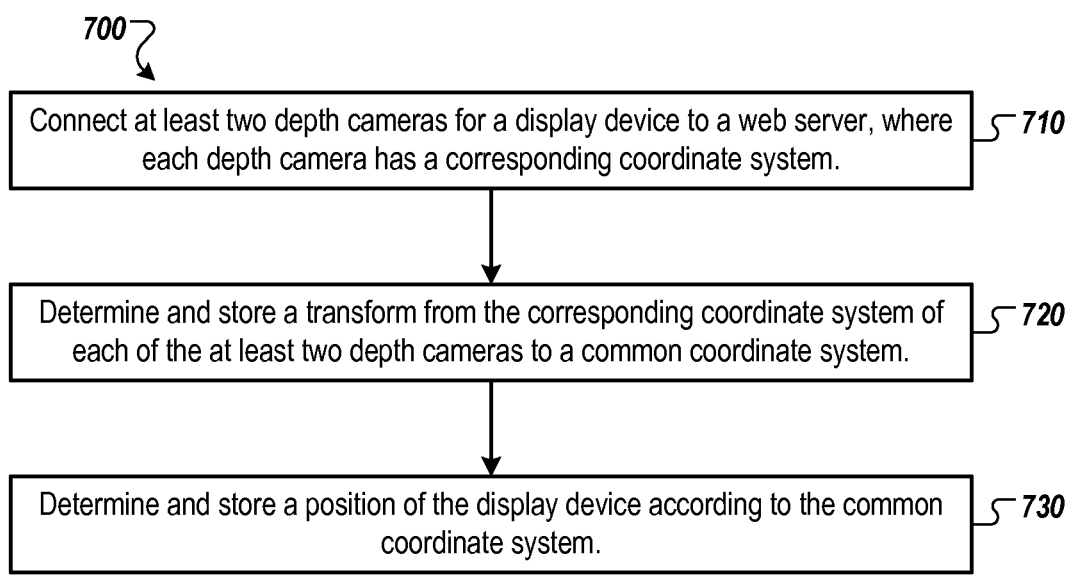
FIG. 7 illustrates an example process by which hardware for providing events responsive to spatial gestures may be installed.

FIG. 7 illustrates an example process 700 by which hardware for providing events responsive to spatial gestures may be installed.

The process 700 begins at step 710, where at least two depth cameras (e.g., two close view depth cameras 620.1 and 620.2) for a display device (e.g., display device 610) are connected (e.g., by a technician) to a web server (e.g., web server 120). Each depth camera has a corresponding coordinate system, which is used to store a position of an object in a field of view for each pixel.

In step 720, the web server determines and stores a transform from the corresponding coordinate system of each of the at least two depth cameras to a common coordinate system.

The transform can be determined using a fusion calibration technique. In fusion calibration, a user (e.g., a technician) can hold and move around a visual marker object in the field of view of the at least two depth cameras and the web server can record the positions of the object in the corresponding coordinate system of each of the at least two depth cameras. The movement of the visual marker object preferably is not within a single plane, as is typical of movements by humans. In some aspects, the user may be prompted to make movements that are not in a single plane. The visual marker object is easily recognizable by the depth cameras and cannot be confused with other objects in the field of view of the depth cameras. Example visual marker objects include a donut-shaped object with two concentric circles, a black-and-white cross, or a circle with a crosshair in the middle.

If the coordinate system of the first depth camera is represented as a matrix A, and the coordinate system of the second depth camera is represented as a matrix B, the equation $AM=B$ can be solved for M, where M is the transform from the coordinate system of the first depth camera to the coordinate system of the second depth camera. M may be a three-dimensional rigid body transform matrix. While only four points in each coordinate system are necessary to solve for M, M can be solved for with a greater number of points using least square error regression to obtain a more accurate transform. The common coordinate system then may be set to the coordinate system of the second depth camera, or the coordinate system of the first depth camera multiplied by M.

In some implementations, all of the obtained positions of the visual marker object may be used. In other aspects, only the most reliable obtained positions of the visual marker object may be used. For example, positions where the visual marker object is moving at a slower speed may be given more weight than positions where the visual marker object is moving at a faster speed, since positions where the visual marker object is moving more slowly can be more reliably obtained. In some cases, positions where the visual marker is moving faster than a threshold speed may not be used. Furthermore, positions where the visual marker object is turning (e.g., slowing down and then speeding up again in a different direction) may be given more weight than other positions. In some aspects, positions where the visual marker is turning may be used to calibrate the frames of the two depth cameras, as the turn must have occurred at a frame corresponding to the same time in both cameras.

In step 730, the web server determines and stores a position of the display device according to the common coordinate system.

According to some examples, to determine the position of the display device, the user (e.g., the technician) places the visual marker object at each of the top left corner of the display device, the top right corner of the display device, and near the center of the bottom of the display device. The position of the visual marker object is computed in the common coordinate system at each of the above places. An representation of a rectangle representing the display device in the common coordinate system may be determined based on the three above positions. As a result of determining and storing the position of the display device according to the common coordinate system, a distance between a user in a field of view of the depth cameras who is moving his/her body to interact with the display device and the display device may be determined. After step 730, the process 700 ends.

Figure 8:
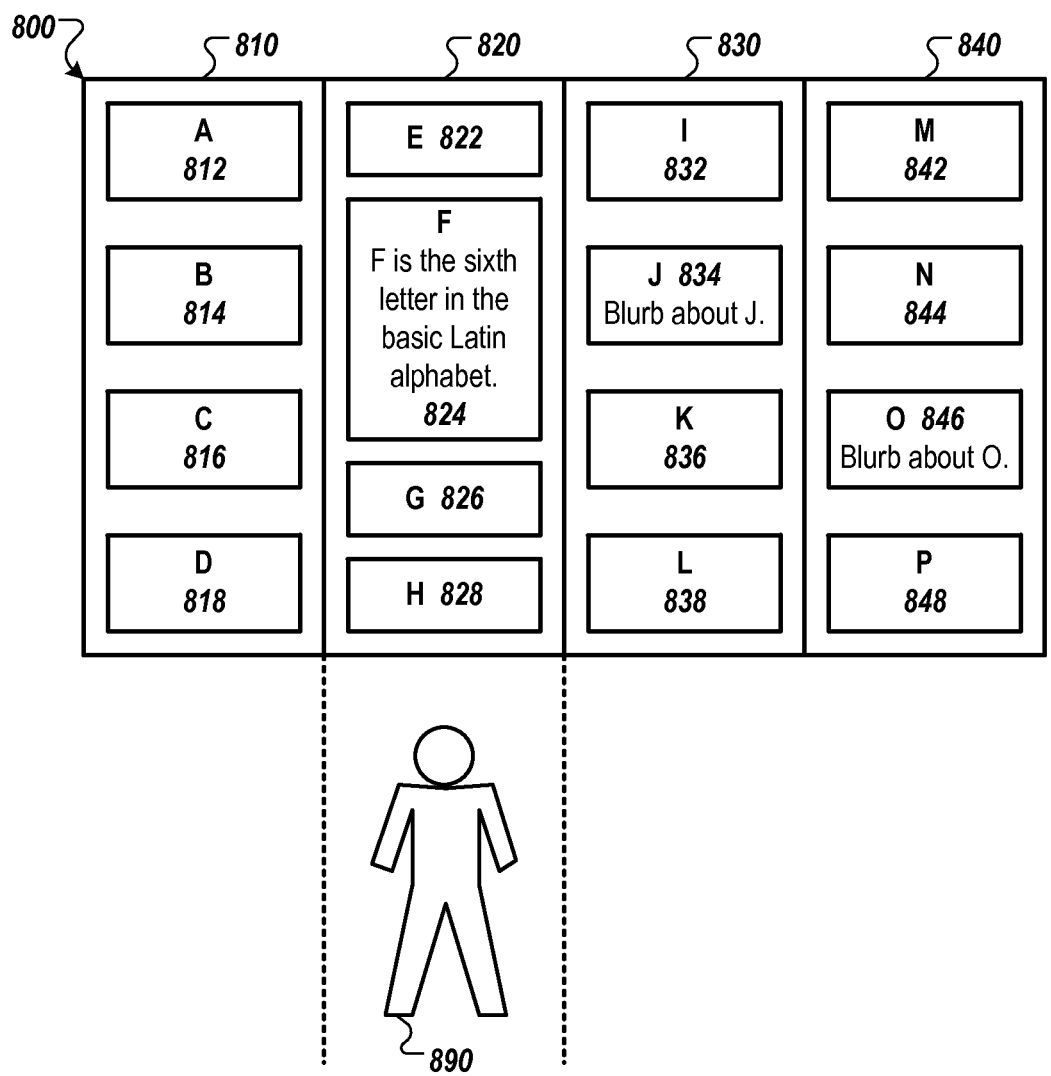
FIG. 8 conceptually illustrates an example electronic system with which some implementations of the subject technology are implemented.

FIG. 8 illustrates an example gesture-based interface 800. The gesture-based interface 800 may be presented using one or more display device (e.g., display device 140 or display device 610). The display device may be coupled with depth cameras (e.g., depth cameras 620.1, 620.2, or 630) for detecting presence of or movements by persons proximate to the display device.

As illustrated, the gesture-based interface 800 includes four columns 810, 820, 830, and 840. While the gesture-based interface 800 is illustrated as including four columns 810, 820, 830, and 840, the gesture-based interface 800 can include any number of columns or other sets of items. A set of items may be presented, for example, in a row, in a circular or elliptical interface, in a rectangular interface, or in any other grouping of items. As shown, a user 890 is standing adjacent to column 820 in the interface 800. Each column 810, 820, 830, and 840 includes icons. Column 810 includes icons 812, 814, 816, and 818. Column 820 includes icons 822, 824, 826, and 828. Column 830 includes icons 832, 834, 836, and 838. Column 840 includes icons 842, 844, 846, and 848.

A computing machine receives depth data indicating the position of the user 890 and determines that the column 820 corresponds to the position of the user 890. A predetermined icon in the column 820, icon 824, is expanded based on the position of the user 890 corresponding to the column 820. The predetermined icon can be any icon in the column 820, for example, the second icon from the top of the column 820, the icon in the column 820 corresponding to the eye level of the user, or the icon 820 corresponding to an eye level of an adult of average height. In some cases, the predetermined icon corresponds to the second icon from the top of the column 820 because the second icon from the top of the column 820 may be the closest to the eye level of an adult person of average height. One or more other icons 822, 826, or 828 in the column 820 can be made smaller to allow for the expansion of the icon 824. Alternatively, an amount of empty space between the icons 822, 824, 826, and 828 in the column 820 can be decreased.

As shown, the icons 812-818, 822-828, 832-838, and 842-848 correspond to articles about letters in the basic Latin alphabet. However, the icons can include any content, for example, image(s), vide(s), or article(s). In some examples, the icons correspond to content (e.g., advertisements, articles, images, or videos) related to a geographic location where the interface 800 is located. For example, the interface 800 may be positioned in a lobby of a corporation and the icons may include content about the corporation (e.g., news stories about the corporation, articles about the history of the corporation, articles about famous people who work at the corporation, etc.). The interface 800 may be positioned outside a historic site and the icons may include content related to the historic site (e.g., articles about the history of the site, videos about historic events at the site or restoration efforts at the site, etc.) The interface 800 may be positioned outside a government building and the icons may include content related to business citizens may conduct at the government building (e.g., if the interface 800 is at a city hall, the icons may include articles or videos related to registering to vote, paying local taxes, obtaining parking permits, registering births, obtaining marriage licenses, etc.).

Prior to expansion, the icons display a title of the article, e.g., "A" for icon 812 or a title and a blurb of the article, e.g., title "J" and blurb "Blurb about J" for icon 834. Upon expansion, as shown with icon 824, the full article is presented. In some cases, the full article is presented in conjunction with a scroll bar for scrolling through the article. The scroll bar can be operated using gestures, for example, by pointing a hand to the up arrow in the scroll bar, pointing a hand to the down arrow in the scroll bar, or pointing a hand to the scroll thumb and moving the hand upward or downward along the scroll bar.

The user 890 may wish to view an icon in his/her column 820 different from the currently expanded icon 824, for example, icon 826. In this case, the person may point a hand to the additional icon 826 in the column 820 that the person wishes to view. Upon detecting, using the depth cameras, the pointing of the hand to the additional icon 826, the computing machine expands the additional icon 826 and decreases the size of the previously expanded icon 824 to provide space for the additional icon 826.

The user 890 may wish to view an icon in a column different from the column 820 corresponding to the position of the user, for example, icon 834 in column 830. To view the icon 834, the user may point a hand toward the icon 834 and drag the icon 834 into his/her column 820. In some cases, visual borders are presented between the columns 810, 820, 830, and 840. Alternatively, no visual boundaries may exist between the columns 810, 820, 830, and 840. The pointing and the dragging is directed by the computing machine using the depth cameras. In response, the computing machine may indicate that the icon 834 is selected (e.g., by highlighting the icon 834) and move the icon 834 into the user's column 820. Once the icon 834 is moved into the column 820, the icon 834 may be expanded and the size of the previously expanded icon 824 may be decreased to provide space for the expansion of the icon 834.

The user 890 may need to leave the user interface 800 but wish to continue interacting with an expanded icon. For example, the user may wish to finish reading an article or viewing a video. To do so, the user may transfer the article to a mobile device (e.g., mobile phone, tablet computer, personal digital assistant, etc.). The computing machine may receive, via the depth cameras, an indication of the person making a hand movement pulling a hand toward the person's self. The computing machine may transmit, to a mobile device, information related to the expanded icon in the column corresponding to the position of the person in response to the received indication of the hand movement. The information may be transmitted to the mobile device using a messaging service (e.g., email or short messaging service) associated with the mobile device if the user provides an email address or telephone number for transmitting information to the mobile device. Alternatively, if the mobile device is being carried by the user and is proximate to the user interface 800, the information may be transmitted to the mobile device by providing a quick response (QR) code to the mobile device or via a short-range radio technology (e.g., NFC or Bluetooth®).

While the subject technology is described in FIG. 8 in conjunction with a single user 890 accessing the interface 800, in some implementations, multiple users can access the interface 800 simultaneously, with each user accessing the interface 800 at his/her own column 810, 820, 830, or 840. The multiple users can interact with the interface 800 independently. Alternatively, two of the multiple users can share content with one another. For example, a first person can wave his/her hand toward a second person to indicate, to the computing machine, that he/she wishes to share an icon over which his/her hand is positioned with the second person. In response, the icon can be highlighted and a pop-up window can be presented in the second person's column indicating that the icon is being offered to the second person. The second person can point his/her hand to an "accept" or "reject" button in the second person's column to accept or reject the transfer. If the second person accepts the transfer, the icon can be moved into the second person's column, and the second person can use his/her hand to expand the shared icon.

Figure 9:
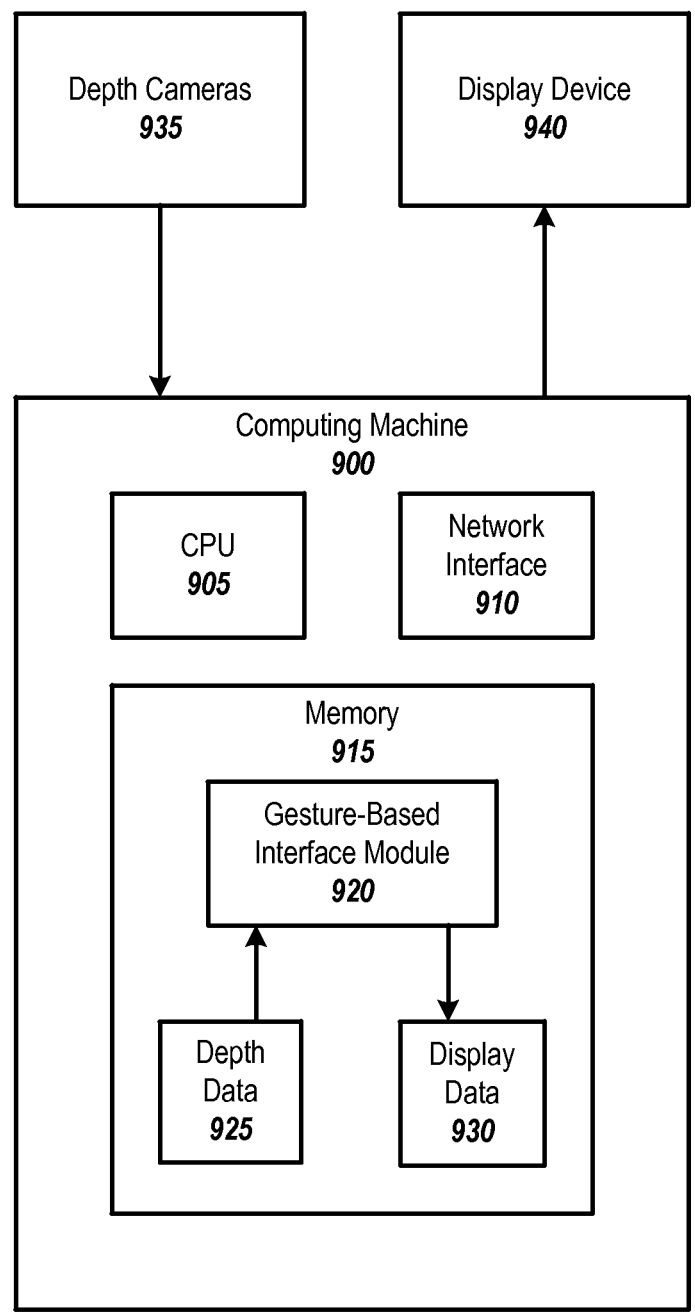
FIG. 9 illustrates an example computing machine configured to provide a gesture-based interface.

FIG. 9 illustrates an example computing machine 900 configured to provide a gesture-based interface. The computing machine 900 can correspond to the web server 120, the web client 130, or both the web server 120 and the web client 130.

As shown, the computing machine 900 includes a central processing unit (CPU) 905, a network interface 910, and a memory 915. The CPU 905 includes one or more processors. The CPU 905 is configured to execute computer instructions that are stored in a computer-readable medium, for example, the memory 915. The network interface 910 is configured to allow the computing machine 900 to transmit and receive data in a network, e.g., the Internet, a cellular network, a local area network (LAN), a wide area network (WAN), a WiFi network, etc. The network interface 910 may include one or more network interface controllers (NICs). The memory 915 stores data and/or instructions. The memory 915 may be one or more of a cache unit, a storage unit, an internal memory unit, or an external memory unit. As illustrated, the memory 915 includes a gesture-based interface module 920, depth data 925, and display data 930.

As illustrated, the computing machine 900 is configured to communicate with depth cameras 935 and a display device 940. For example, the computing machine 900 can receive depth data 925 from the depth cameras 935 or transmit display data 930 to the display device 940. The depth cameras 935 can correspond to depth cameras 110. The display device 940 can correspond to the display device 140. While a single display device 940 is illustrated, the subject technology may be implemented with multiple display devices, which together accomplish the functions of the display device 940.

In some examples, the computing machine 900 corresponds to the web server 120. The depth cameras 935 are directly connected (e.g., via a wire or a universal serial bus (USB) port) to the computing machine 900. The computing machine 900 communicates with the display device 940 via another machine (e.g., web client 130) directly connected to the display device 940 and via a network accessible using the network interface 910.

In some examples, the computing machine 900 corresponds to the web client 130. The display device 940 is directly connected (e.g., via a wire or video port) to the computing machine 900. The computing machine 900 communicates with the depth cameras 935 via another machine (e.g., web server 120) directly connected to the depth cameras 835 and via the network accessible using the network interface 910.

The gesture-based interface module 920 includes code to receive the depth data 925 indicative of a person (e.g., user 890) interacting with the display device 940 (e.g., displaying gesture-based interface 800), while the display device 940 is displaying multiple columns (e.g., columns 810, 820, 830, and 840), where each of the multiple columns includes multiple icons (e.g., icons 812-818, 822-828, 832-838, and 842-848). The depth data 925 can be received via the depth cameras 935 or via the network. The columns and icons can be stored in the display data 930. A column may include a set of icons that are configured to presented together in a column (e.g., in column 820) on the display device 940. The column may include a predetermined number of icons and may be stored using an array, a linked list, a stack, a queue, or any other known data structure. In some examples, alternative visual arrangement(s) may be used in place of columns, as described herein. For example, sets of icons can be presented as row(s), circular sets of icons, rectangular sets of icons, etc. The gesture-based interface module 920 includes code to determine a column, from among the multiple columns, corresponding to a position of the person. For example, the person can be standing in front of one of the multiple columns. The gesture-based interface module 920 includes code to provide a signal for expanding a predetermined icon in the column corresponding to the position of the person. For example, the gesture-based interface module 920 can include code to expand the predetermined icon in the display data 930 and provide the display data 930 with the expanded predetermined icon to the display device 940 for display. The display data 930 can be provided to the display device 940 directly from the computing machine 900 or via a remote machine accessible via the network using a wired and/or wireless connection. In some examples, the predetermined icon in the column is the second highest icon in the column, where the column has icons arranged vertically. Some example operations of the gesture-based interface module 920 are described in conjunction with FIG. 10.

Figure 10:
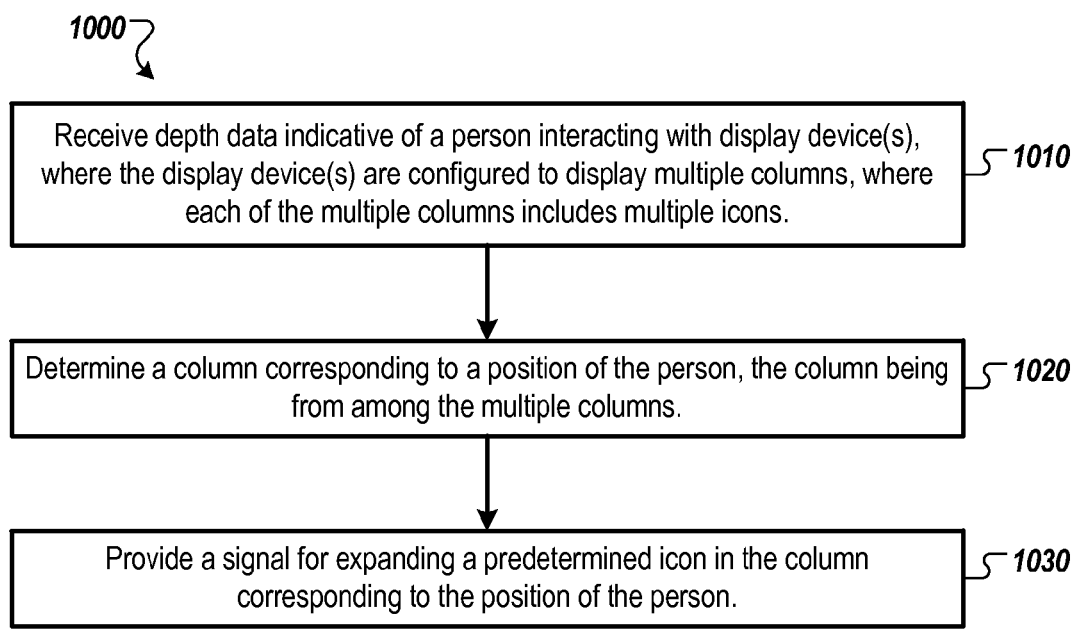
FIG. 10 illustrates an example process by which a gesture-based interface may be provided.

FIG. 10 illustrates an example process 1000 by which a gesture-based interface may be provided.

The process 1000 begins at step 1010, where a computing machine (e.g., computing machine 900, via operation of the gesture-based interface module 920) receives (e.g., from the depth cameras 935 or a remote machine coupled with the depth cameras 935) depth data indicative of a person interacting with display device(s) (e.g., display device 940). The display device(s) are configured to display multiple columns. Each of the multiple columns includes multiple icons.

In step 1020, the computing machine determines a column, from among the multiple columns, corresponding to a position of the person. For example, the person can be standing in front of the column.

In step 1030, the computing machine provides (e.g., to the display device(s) or to a remote machine coupled with the display device(s)) a signal for expanding a predetermined icon in the column corresponding to the position of the person. Providing the signal for expanding the predetermined icon can include firing an event (e.g., a JavaScript event) corresponding to the person interacting with the display device(s) and the column corresponding to the position of the person. The predetermined icon can be expanded in response to the fired event.

In order to allow for expanding the predetermined icon, the size of at least one other icon in the column may be decreased. The other icon is different from the predetermined icon. In some examples, prior to expansion, the predetermined icon includes a title of an article and, optionally, a blurb of the article. Expanding the predetermined icon includes presenting the text from the article in a single display area or in a scrollable display area. In some examples, prior to expansion, the predetermined icon includes a thumbnail of a video or a title of the video. Expanding the predetermined icon includes playing at least a portion of the video. During playing, the video may be expanded from a thumbnail size to a larger size. In some examples, prior to expansion, the predetermined icon includes a thumbnail of an image. Expanding the predetermined icon includes presenting a full or standard-sized version of the image.

In some implementations, two or more people can be interacting with the display device simultaneously, with a first person interacting with a first column according to the process 1000 and a second person interacting with a second column according to the process 1000. For example, the second person can be standing to the right of the first person and accessing the second column immediately to the right of the first column of the first person. The computing machine can receive an indication of a hand movement of the first person for transferring an expanded icon being viewed in the first column to the second person. The second column of the second person can then display an indication of the transferring, for example, a pop-up window can state "Transfer Proposed," and provide buttons to accept or reject the transfer. The second person can make a hand movement for accepting the transfer, for example, pointing a hand toward the button to accept the transfer. Upon detecting (e.g., via the depth cameras 935) the hand movement for accepting the transfer, the computing machine can copy the icon from the first column into the second column. The copied icon can be expanded in the second column, while the size of another icon, which was previously being viewed by or expanded for the second person, can be decreased.

Figure 11:
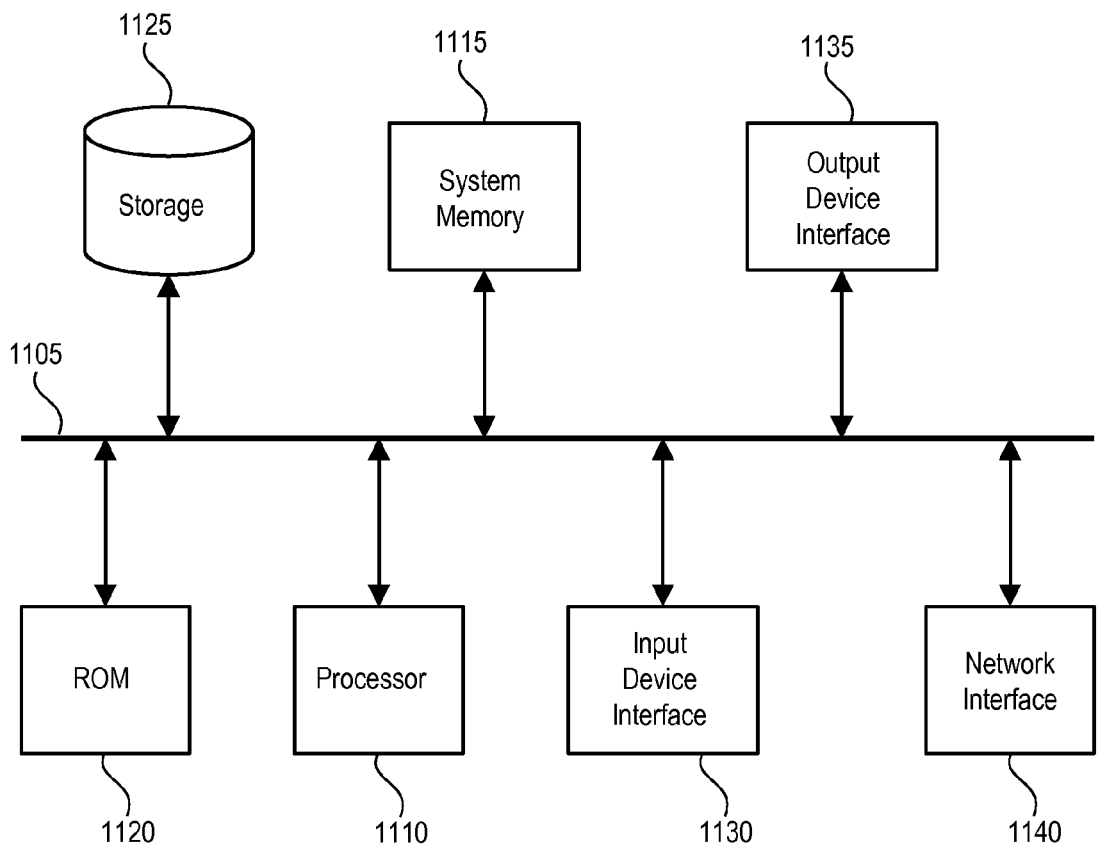
FIG. 11 conceptually illustrates an example electronic system with which some implementations of the subject technology are implemented.

FIG. 11 conceptually illustrates an electronic system 1100 with which some implementations of the subject technology are implemented. For example, one or more of the web server 120, the web client 130, or the computing machine 900 may be implemented using the arrangement of the electronic system 1100. The electronic system 1100 can be a computer (e.g., a mobile phone, PDA), or any other sort of electronic device. Such an electronic system includes various types of computer readable media and interfaces for various other types of computer readable media. Electronic system 1100 includes a bus 1105, processing unit(s) 1110, a system memory 1115, a read-only memory 1120, a permanent storage device 1125, an input device interface 1130, an output device interface 1135, and a network interface 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1120, the system memory 1115, and the permanent storage device 1125.

From these various memory units, the processing unit(s) 1110 retrieves instructions to execute and data to process in order to execute the processes of the subject technology. The processing unit(s) can be a single processor or a multi-core processor in different implementations.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some implementations of the subject technology use a mass-storage device (for example a magnetic or optical disk and its corresponding disk drive) as the permanent storage device 1125.

Other implementations use a removable storage device (for example a floppy disk, flash drive, and its corresponding disk drive) as the permanent storage device 1125. Like the permanent storage device 1125, the system memory 1115 is a read-and-write memory device. However, unlike storage device 1125, the system memory 1115 is a volatile read-and-write memory, such a random access memory. The system memory 1115 stores some of the instructions and data that the processor needs at runtime. In some implementations, the processes of the subject technology are stored in the system memory 1115, the permanent storage device 1125, or the read-only memory 1120. For example, the various memory units include instructions for providing events responsive to spatial gestures, processing spatial gestures, or providing a gesture-based interface in accordance with some implementations. From these various memory units, the processing unit(s) 1110 retrieves instructions to execute and data to process in order to execute the processes of some implementations.

The bus 1105 also connects to the input and output device interfaces 1130 and 1135. The input device interface 1130 enables the user to communicate information and select commands to the electronic system. Input devices used with input device interface 1130 include, for example, alphanumeric keyboards and pointing devices (also called "cursor control devices"). Output device interfaces 1135 enables, for example, the display of images generated by the electronic system 1100. Output devices used with output device interface 1135 include, for example, printers and display devices, for example cathode ray tubes (CRT) or liquid crystal displays (LCD). Some implementations include devices for example a touch screen that functions as both input and output devices.

Finally, as shown in FIG. 11, bus 1105 also couples electronic system 1100 to a network (not shown) through a network interface 1140. In this manner, the electronic system

1100 can be a part of a network of computers (for example a local area network ("LAN"), a wide area network ("WAN"), or an Intranet, or a network of networks, for example the Internet. Any or all components of electronic system 1100 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for providing a gesture-based interface, the method comprising the following operations performed by one or more processors:
   receiving, prior to analyzing any gesture input from a person, depth data including data indicative of a location of the person relative to a plurality of columns of one or more display devices, wherein each of the plurality of columns comprises a plurality of icons;
   determining, using the depth data, a column corresponding to a position of the person with respect to the one or more display devices, the column being from among the plurality of columns displayed at the one or more display devices; and
   providing, responsive to determining the column and prior to analyzing any gesture input from the person, a signal for expanding a predetermined icon in the column corresponding to the position of the person with respect to the one or more display devices.

2. The method of claim 1, further comprising:
   providing a signal for decreasing a size of at least one icon in the column, wherein the at least one icon is different from the predetermined icon.

3. The method of claim 1, wherein the predetermined icon comprises a title of an article, and wherein expanding the predetermined icon comprises presenting text from the article.

4. The method of claim 1, wherein the predetermined icon comprises a thumbnail from a video, and wherein expanding the predetermined icon comprises playing at least a portion of the video.

5. The method of claim 1, wherein providing the signal for expanding the predetermined icon comprises:
   firing an event corresponding to the person interacting with the one or more display devices and the column corresponding to the position of the person, wherein the predetermined icon is expanded in response to the fired event.

6. The method of claim 1, further comprising:
   determining, based on the received depth data, that the person made a hand movement pointing a hand to an additional icon in the column corresponding to the position of the person with respect to the one or more display devices;
   providing a signal for expanding the additional icon in response to the hand movement; and
   providing a signal for decreasing a size of the predetermined icon in response to the hand movement.

7. The method of claim 1, further comprising:
   determining, based on the received depth data, that the person made a hand movement pointing a hand to an additional icon in a second column different from the column corresponding to the position of the person with respect to the one or more display devices;
   providing a signal for providing for display of an indication of selection of the additional icon;
   determining, based on the received depth data, that the person made a hand movement for moving the additional icon into the column corresponding to the position of the person;
   providing a signal for moving the additional icon into the column corresponding to the position of the person;
   providing a signal for expanding the additional icon in the column corresponding to the position of the person; and
   providing a signal for decreasing a size of the predetermined icon.

8. The method of claim 1, further comprising:
   determining, based on the received depth data, that the person moved a hand across a spatial region corresponding to the expanded predetermined icon; and
   providing a signal for scrolling in the expanded predetermined icon in response to the received indication of the moving of the hand by the person.

9. The method of claim 1, further comprising:
   receiving an indication of a hand movement pulling a hand toward the person's self; and transmitting, to a mobile device, data enabling the mobile device to present the corresponding media of the predetermined icon in response to the received indication of the hand movement.

10. A non-transitory computer-readable medium for providing a gesture-based interface, the computer-readable medium comprising instructions which, when executed by one or more computers, cause the one or more computers to implement a method, the method comprising:

receiving, prior to analyzing any gesture input from a first person or a second person, depth data including data indicative of respective locations of the first person and the second person relative to a plurality of columns of one or more display devices, wherein the one or more display devices display a plurality of sets of icons arranged with respect to the plurality of columns;

determining, using the depth data, a first set of icons corresponding to a position of the first person with respect to the one or more display devices, the first set of icons being from among the plurality of sets of icons displayed at the one or more display devices;

determining, using the depth data, a second set of icons corresponding to a position of the second person with respect to the one or more display devices, the second set of icons being from among the plurality of sets of icons displayed at the one or more display devices; and providing, responsive to determining the first set of icons and the second set of icons and prior to analyzing any gesture input from the first person or the second person, a command for expanding a first predetermined icon in the first set of icons and for expanding a second predetermined icon in the second set of icons, while continuing to provide for display of the plurality of sets of icons.

11. The non-transitory computer-readable medium of claim 10, wherein the first predetermined icon comprises a title of an article and a blurb of the article, and wherein expanding the first predetermined icon comprises presenting text from the article.

12. The non-transitory computer-readable medium of claim 10, wherein the first predetermined icon comprises a thumbnail from a video, and wherein expanding the first predetermined icon comprises playing at least a portion of the video.

13. The non-transitory computer-readable medium of claim 10, wherein providing the command for expanding the first predetermined icon comprises:

firing an event corresponding to the first person interacting with the one or more display devices and the first set corresponding to the position of the first person, wherein the first predetermined icon is expanded in response to the fired event.

14. The non-transitory computer-readable medium of claim 10, the method further comprising:

determining, based on the received depth data, that the first person made a hand movement pointing a hand to an additional icon in the set corresponding to the position of the first person;

providing a command for expanding the additional icon in response to the hand movement; and providing a command for decreasing a size of the first predetermined icon in response to the hand movement.

15. The non-transitory computer-readable medium of claim 10, the method further comprising:

determining, based on the received depth data, that the first person made a hand movement for transferring the first predetermined icon to the second person;

providing a command for providing for display of an indication of the transferring within the second set of icons;

determining, based on the received depth data, that the second person made a hand movement for accepting the transferring of the first predetermined icon;

providing a command for copying the first predetermined icon into the second set;

providing a command for expanding the copy of the first predetermined icon in the second set; and providing a command for decreasing a size of the second predetermined icon in the second set.

16. A system for providing a gesture-based interface, the system comprising:

one or more processors;

a memory comprising instructions which, when executed by the one or more processors, cause the one or more processors to implement the following operations:

receiving, prior to analyzing any gesture input from a person, depth data including data indicative of a location of the person relative to a plurality of columns of one or more display devices, wherein each of the plurality of columns comprises a plurality of icons;

determining, using the depth data, a column corresponding to a position of the person with respect to the one or more display devices, the column being from among the plurality of columns;

providing, responsive to determining the column and prior to analyzing any gesture input from the person, a signal for expanding a predetermined icon in the column corresponding to the position of the person with respect to the one or more display devices; and providing, responsive to determining the column, a signal for decreasing a size of at least one other icon in the column corresponding to the position of the person with respect to the one or more display devices.

17. The system of claim 16, further comprising:
one or more depth cameras, wherein the depth data is received via the one or more depth cameras.

18. The system of claim 16, further comprising:
the one or more display devices.

19. The system of claim 16, wherein the depth data is received, via a network, from a remote computing device.

20. The system of claim 16, wherein the signal for expanding the predetermined icon is provided, via a network, to a remote computing device.

21. The non-transitory computer-readable medium of claim 1, wherein providing the signal for expanding the predetermined icon further comprises:

determining an eye-level height of the person; and identifying the predetermined icon as an icon, among the plurality of icons in the column corresponding to the position of the person, having a height corresponding to the eye-level height of the person.

22. The system of claim 16, wherein providing the signal for expanding the predetermined icon further comprises:

determining an eye-level height of the person; and identifying the predetermined icon as an icon, among the plurality of icons in the column corresponding to the position of the person, having a height corresponding to an eye-level height of the person.

* * * * *